June 24, 1924.
C. STEENSTRUP
1,498,894
METHOD OF MANUFACTURING PACKING ELEMENTS
Filed April 28, 1922   2 Sheets-Sheet 1
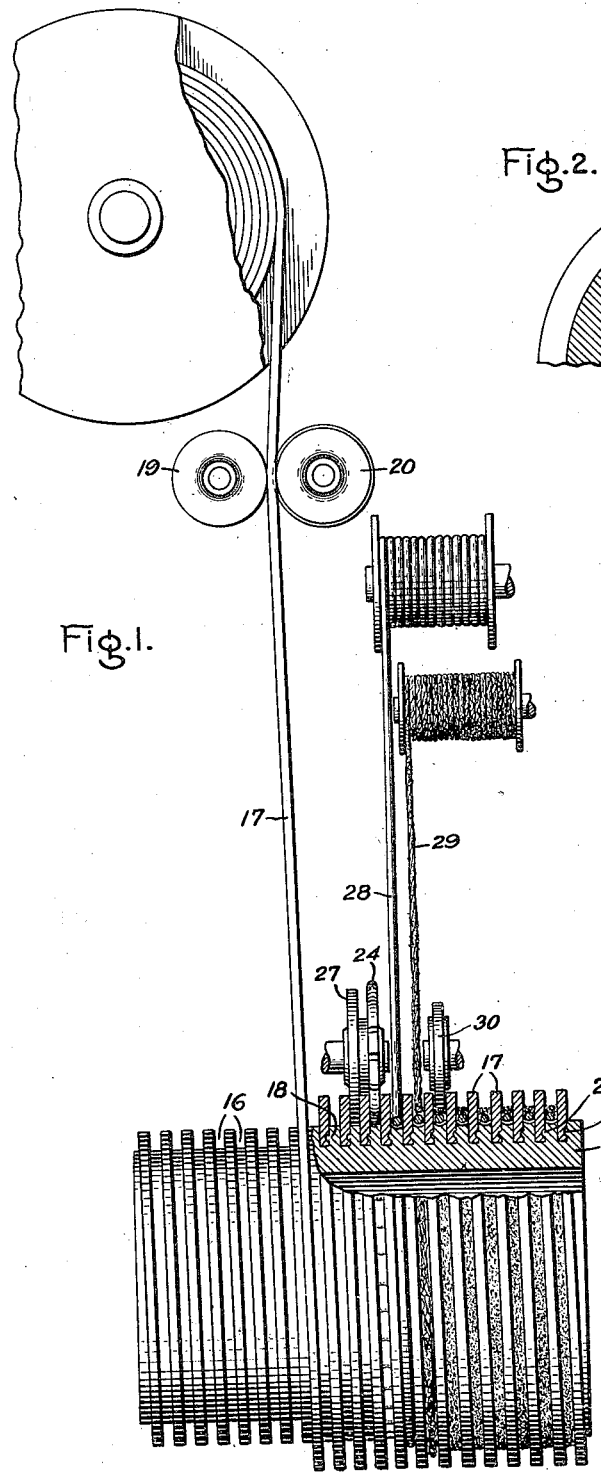
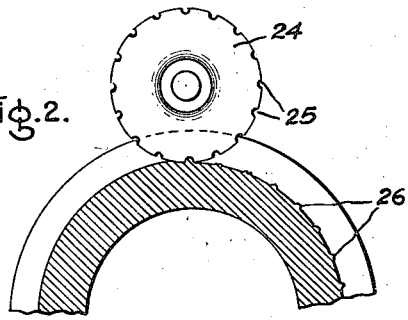
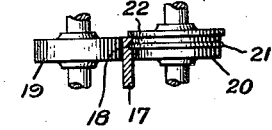
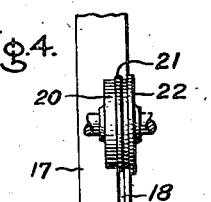
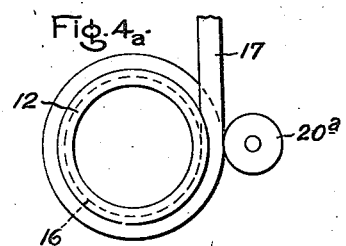
Inventor:
Christian Steenstrup,
by Albert G. Davis
His Attorney.

June 24, 1924.
C. STEENSTRUP
1,498,894
METHOD OF MANUFACTURING PACKING ELEMENTS
Filed April 28, 1922    2 Sheets-Sheet 2
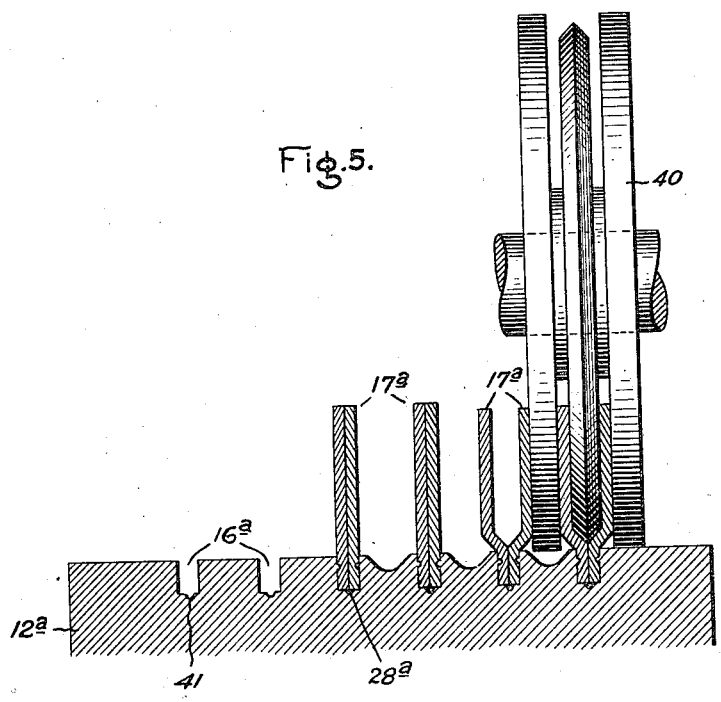
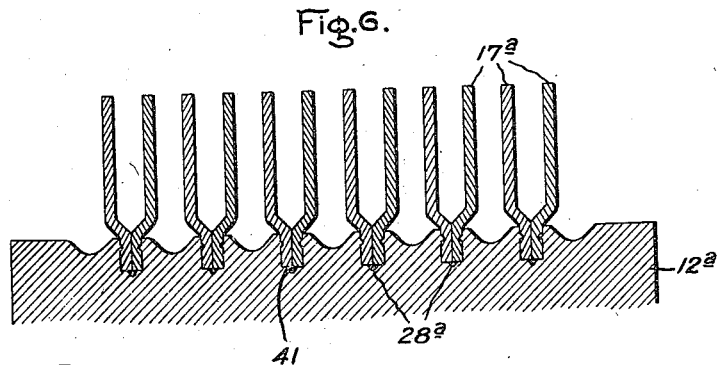
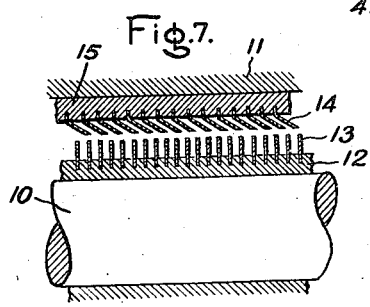
Inventor:
Christian Steenstrup,
by *Albert G. Davis*
His Attorney.

Patented June 24, 1924.

1,498,894

UNITED STATES PATENT OFFICE.

CHRISTIAN STEENSTRUP, OF SCHENECTADY, NEW YORK, ASSIGNOR TO GENERAL ELECTRIC COMPANY, A CORPORATION OF NEW YORK.

METHOD OF MANUFACTURING PACKING ELEMENTS.

Application filed April 28, 1922. Serial No. 557,232.

*To all whom it may concern:*

Be it known that I, CHRISTIAN STEEN-STRUP, a citizen of the United States, residing at Schenectady, county of Schenectady, State of New York, have invented certain new and useful Improvements in Methods of Manufacturing Packing Elements, of which the following is a specification.

The present invention relates to packings of the so-termed labyrinth type which are used to prevent leakage between relatively rotating members, and has for its object to provide an improved method of manufacturing packings or packing elements of this general type.

One application of my invention, and one to which it is particularly well adapted, is in the manufacture of shaft packings for elastic fluid turbines and I have more particularly illustrated and described this application. It will be understood, however, that the method may be applied wherever found applicable.

For a consideration of what I believe to be novel and my invention, attention is directed to the accompanying description and the claims appended thereto.

In the drawing, Fig. 1 is a view of a more or less diagrammatic nature illustrating my invention; Figs. 2, 3 and 4 are detail views of parts shown in Fig. 1; Fig. 4ᵃ is a detail view of certain parts; Figs. 5 and 6 are sectional views illustrating a modification, and Fig. 7 is a sectional view illustrating a complete shaft packing.

Referring first to Fig. 7, 10 and 11 indicate two relatively rotating members, for example, the shaft and an adjacent wall of an elastic fluid turbine through which the shaft passes. The packing between them for preventing leakage comprises a carrying member 12, here taking the form of a cylinder, which is mounted on shaft 10 and from which projects a plurality of radially-extending, spaced, annular packing teeth 13. Packing teeth 13 pack against similar annular packing teeth 14 which project from a carrying member 15 fixed to wall 11. Packing teeth 14 with advantage may be bent angularly toward the direction of leakage flow, such an arrangement being illustrated. In a packing of this general type, which is now a known type, it is desirable that the packing teeth be made of thin material and that they be close together if the best results are to be obtained. For example, it is desirable to use packing teeth of the order of 0.025 inch in thickness and spaced apart a distance of the order of 0.035 inch. The mounting of such thin packing teeth so close together on a carrying member offers great difficulties from a manufacturing standpoint and more particularly the object of my invention is to provide an improved method of manufacturing such packings which can be carried out readily at a reasonable cost, insures the firm anchoring of the packing teeth to the carrying member and enables the teeth to be located as close together as may be desired.

In carrying out my invention, I take a carrying member, such as the carrying member 12 shown in Fig. 7, and cut in its surface a continuous spiral slot or groove 16 of a width to receive edgewise the material which forms the packing teeth and of a depth to suitably anchor the teeth. I have found a groove depth of the order of 0.045 inch to be satisfactory in certain cases but this may, of course, be varied to meet the requirements of any particular case. I then take a continuous strip of material 17 which is to form the packing teeth and wind it edgewise on the carrying member with one edge in slot or groove 16. Monel metal may be used with advantage for the packing strips because of its rust-proof properties. The edge of the packing strip which is wound in slot or groove 16 is preferably provided on either one or both sides with a continuous groove 18, it being shown in the present instance with a groove on only one side as this is usually sufficient. Groove 18 may be formed in any suitable manner. At present I prefer to form it by passing the strip between the two rollers 19 and 20, roller 20 being provided with a bead 21 which presses into the metal of the strip as is shown particularly in Figs. 3 and 4. Roller 20 is also provided with a flange 22 against which the edge of strip 17 runs so as to keep the strip correctly positioned.

At the same time I form groove 18 I also utilize rollers 19 and 20 to dimension the width of the edge of the strip which is to lie in slot or groove 16. To this end I arrange the rollers so they may be adjusted toward and away from each other and set them a distance apart approximately equal to the width of slot or groove 16 in any particular instance. This arrangement is desirable because in actual practice I find that the widths of the slots or grooves 16 in different carrying members 12 will vary slightly due to the wear on the tool used in cutting them and although this variation will be ordinarily of the order of only a few thousandths of an inch it may interfere with the edge of the strip entering the groove. I accordingly make the strip of a width to fit a groove of the maximum width which will be cut with a new tool. I then in each instance measure the width of the slot or groove 16 in the carrying member and set rollers 19 and 20 accordingly so that, if the groove is under width, the rollers will squeeze the edge of the strip to bring it to a width to fit correctly in the groove. In winding the edge of strip 17 in groove 16 a suitable roller 20$^a$ as shown in Fig. 4$^a$ may be used to force the edge of the strip into the groove. This roller is omitted from Fig. 1 to make the drawing clearer.

After the edge of strip 17 is wound into slot or groove 16 I then fasten it tightly in the groove in what may be termed an initial or temporary manner by crushing down the metal of the carrying member between successive turns to bring it into firm engagement with the edge of the strip, at the same time squeezing metal into groove 18 as shown at 23 in Fig. 1. This operation may be performed by means of a roller 24 adapted to run in the space between the convolutions of strip 17 and bear against the metal of the carrying member to crush it. There are always slight variations in dimensions of the strip 17 and slot or groove 16 so that at some points less crushing is required than at others and to take care of this I provide roller 24 with indentations 25 into which excess metal may flow. This is illustrated more particularly in Fig. 2 where 26 indicates metal which has been forced up into indentations 25. At points opposite indentations 25 the edge of strip 17 is not so tightly squeezed in, a feature having utility in connection with further steps of my method as pointed out hereinafter.

Adjacent roller 24 I provide a roller 27 which runs between the convolutions of strip 17 on the side of the strip opposite to roller 24 and which serves as a backing for the strip to prevent it from being bent sidewise and also in conjunction with roller 24, as a straightening means in case the strip is bent at any point. Roller 27 does not extend quite to the surface of carrying member 12 and does not assist in performing the crushing operation although if desired, it may be made to do so. Rollers 24 and 27 are carried by the same shaft and viewed from one aspect may be considered as a single roller having a groove in which the convolutions of the packing strip fit, the one side of the roller being formed to perform the crushing operation.

After the material between the convolutions of strip 17 has been crushed by roller 24. I wind between the convolutions a wire 28 of copper or other suitable metal and on top the wire I wind an asbestos string 29, the wire and asbestos being forced to the bottom of the space between the convolutions of strip 17 by a roller 30. The wire 28 is used in the operation of permanently uniting the parts by fusion of metal as described hereinafter and the purpose of the asbestos string is to hold the fusible metal from running out when such metal becomes molten during the fusion operation.

It will be understood that the various operations or steps described above all may be performed simultaneously and that the parts performing the operations or steps may be arranged to operate in the same space between convolutions one after another, if found desirable. In the drawing, they are shown operating in different spaces for clearness of illustration, but this particular arrangement may or may not be followed as found desirable. The spool carrying packing strip 17, the various rollers and the spools carrying wire 28 and asbestos string 29 may be mounted on a common carriage which during the winding operation is fed transversely of carrying member 12. Carrying member 12 may be mounted on a suitable support which can be turned to rotate member 12. If this arrangement is used, the end of strip 17 is fastened at the forward end of slot or groove 16, (this being the right hand end in Fig. 1) and the carrying member 12 is then turned in a direction toward the observer, Fig. 1. The edge of the strip is thus continuously forced into the slot or groove in an obvious manner and either with or without the aid of roller 20$^a$, although I preferably employ such a roller. At the same time roller 24 performs its crushing operation and the wire 28 and asbestos string 29 are wound into place. After strip 17 has been wound to the end of groove 16, the strip is cut off and the end fastened in a temporary manner in any suitable way.

There is thus provided a carrying member having a continuous strip of metal wound edgewise thereon and fastened in what may be termed a temporary or initial manner. The next step in my method comprises uniting the carrying member and strip permanently. This I do by uniting them by fusion of metal such as by soldering, brazing, welding or the like, so as to form in substance a unitary structure. Any suitable method of uniting by fusion of metal may be employed but preferably I employ the method set forth in my co-pending application Ser. No. 354,014, filed Jan. 26, 1920.

In carrying out this particular method of uniting by fusion of metal, copper is preferably used as the fusible uniting metal. Briefly, this method comprises placing the structure to be united in a suitable furnace in an atmosphere of hydrogen or other suitable reducing gas and raising the temperature so as to fuse the copper. Under these circumstances the molten copper will be drawn into the interstitial spaces between the parts to be united no matter how narrow they may be and will form an alloy uniting the abutting surfaces. In fact, in carrying out this method it is desirable for the best results, that the surfaces to be joined be in as close engagement with each other as possible and it is for this reason primarily that the crushing roller 24 is used. For the copper to penetrate the interstitial spaces and effect the uniting of the parts, requires quite some time and when one of the metals to be united in Monel metal I have found that during the uniting operation the molten copper will to a greater or lesser extent as time goes on, alloy with the nickel of the Monel metal forming an alloy having a melting point higher than the temperature at which the furnace is held. This tends to retard and interfere with the uniting operation and prevents the penetrating of the molten copper to a great depth. This difficulty I overcome to a great extent by the use of the corrugated roller 24 which as pointed out above leaves circumferentially spaced points where the metal of the carrying member is not so firmly crushed against the packing strip. At these spaced points, therefore, there are minute radially extending passages from the surface of the carrying member to the bottom of the groove through which the molten copper may quickly pass, thus forming radially extending strips of molten copper which although of a minute character, provide copper for penetration in all directions.

After the uniting by fusion of metal operation is completed, the carrying member may be machined to bring it to the desired dimensions after which the packing structure is ready for use.

In Figs. 5 and 6 I have illustrated a modification which it may be found desirable to employ under some circumstances and which has the advantages that for the same width and spacing of the packing strip, the groove to be cut in the carrying member may be wider and the convolutions further apart. This means that the groove is easier to cut due to its greater width and pitch. According to this modification, I cut the groove 16ª in carrying member 12ª of a width double the thickness of the material forming the packing strip 17ª and of the desired pitch, and then following the method already described I wind in the groove two strips 17ª side by side as shown at the left hand side of Fig. 5 and fasten them in a temporary manner. Then by means of a suitable tool such as the roller structure 40 I bend or force the two strips apart as shown at the right hand side of Fig. 5 and in Fig. 6 to form the spaced packing strips. The structure is then permanently united by fusion of metal as described in connection with Figs. 1 to 4ª inclusive.

Instead of placing the copper or other uniting metal between the turns of the packing strip I may place it in the bottom of groove 16 and wind the packing strip on top of it. This arrangement is illustrated in Figs. 5 and 6 wherein the copper wire 28ª is shown as lying in a shallow groove 41 in the bottom of groove 16ª. This arrangement has certain advantages particularly where Monel metal is one of the metals to be united, since it brings the copper directly adjacent the joints between the parts to be united so that it may penetrate them before alloying with nickel of the Monel metal.

It will be understood that in all the views the parts are shown out of proportion and exaggerated in order to illustrate the features of the invention. The proper proportioning of the parts, however, is a matter of design which can be readily carried out by those familiar with the requirements of any particular case to which my invention is to be applied.

In accordance with the provisions of the patent statutes, I have described the principle of operation of my invention, together with the particular method which I now consider to represent the best manner for carrying it out but I desire to have it understood that the particular method disclosed is only illustrative and that the invention may be carried out with such modifications as come within the scope of the appended claims.

What I claim as new and desire to secure by Letters Patent of the United States, is,—

1. The method of manufacturing a packing element which comprises providing a carrying member having a continuous groove in its surface and strip material of ribbon form, said groove having a width about equal to the thickness of said strip material, winding the strip material edgewise in said groove, and permanently fastening it therein by fusion of metal.

2. The method of manufacturing a packing element which comprises providing a carrying member having a continuous groove in its surface and strip material of ribbon form, said groove having a width about equal to the thickness of said strip material, winding the strip material edgewise in said groove, crushing the material of the carrying member adjacent said groove to fasten the strip material in an initial manner, and then permanently fastening it therein by fusion of metal.

3. The method of manufacturing a packing element which comprises providing a carrying member having a continuous groove in its surface and a strip of material in the form of a ribbon, winding the strip edgewise in said groove, crushing the material of the carrying member adjacent said groove to fasten the strip therein in an initial manner, and then permanently fastening it therein by fusion of metal.

4. The method of manufacturing a packing element which comprises providing a carrying member having a continuous groove in its surface and a strip of material in the form of a ribbon, winding the strip edgewise in said groove, crushing the material of the carrying member adjacent said groove by means of a corrugated roller, providing fusible uniting material such as copper along said groove, and then permanently uniting the carrying member and strip by fusing the uniting material in an atmosphere of a reducing gas.

5. The method of manufacturing a packing element which comprises taking a carrying member having a continuous slot in its surface and a strip of ribbon having a longitudinally extending groove along one of its edges, winding the ribbon on the carrying member with the edge having the groove in the slot in the carrying member, crushing the material of the carrying member adjacent the slot to fix the ribbon in the slot in an initial manner, and then permanently fastening the ribbon to the carrying member by fusion of metal.

6. The method of manufacturing a packing element which comprises taking a carrying member having a continuous slot in its surface and a strip of ribbon having a longitudinally extending groove along one of its edges, winding the ribbon on the carrying member with the edge having the groove in the slot in the carrying member, crushing the material of the carrying member adjacent the slot by means of a corrugated roller to fix the ribbon in the slot in an initial manner, and then permanently fastening the ribbon to the carrying member by fusion of metal.

7. The method of manufacturing a packing element which comprises taking a carrying member having a continuous slot in its surface and a strip of ribbon having a longitudinally extending groove along one of its edges, winding the ribbon on the carrying member with the edge having the groove in the slot in the carrying member, crushing the material of the carrying member adjacent the slot by means of a corrugated roller to fix the ribbon in the slot in an initial manner, providing a fusible uniting material such as copper along said slot, and then permanently uniting the strip to the carrying member by fusing the uniting material in a reducing atmosphere.

8. The method of manufacturing a packing element which comprises taking a carrying member having a continuous groove in its surface, mounting two flat ribbons edgewise in said groove, and separating the ribbons to form spaced packing teeth.

9. The method of manufacturing a packing element which comprises taking a carrying member having a continuous groove in its surface, mounting two flat ribbons edgewise in said groove, crushing the material of the carrying member adjacent the groove to fasten the strips therein, and separating the ribbons to form spaced packing teeth.

10. The method of manufacturing a packing element which comprises taking a carrying member having a continuous groove in its surface, mounting two flat ribbons edgewise in said groove, crushing the material of the carrying member adjacent the groove to fasten the strips therein in an initial manner, separating the ribbons to form spaced packing teeth and permanently uniting the ribbons and carrying member by fusion of metal.

In witness whereof I have hereunto set my hand this 27th day of April, 1922.

CHRISTIAN STEENSTRUP